(12) United States Patent
Covell et al.

(10) Patent No.: US 8,566,331 B1
(45) Date of Patent: *Oct. 22, 2013

(54) ORDERING IMAGE SEARCH RESULTS

(75) Inventors: Michele Covell, Palo Alto, CA (US);
Yushi Jing, San Francisco, CA (US);
Jingbin Wang, Mountain View, CA (US); Charles J. Rosenberg, Cupertino, CA (US); Sarah Moussa, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,221

(22) Filed: Jun. 25, 2012

Related U.S. Application Data

(63) Continuation of application No. 12/475,006, filed on May 29, 2009, now Pat. No. 8,209,330.

(51) Int. Cl.
*G06F 17/30* (2006.01)

(52) U.S. Cl.
USPC .......................................... 707/749

(58) Field of Classification Search
USPC ................................ 707/728, 749
See application file for complete search history.

(56) References Cited

U.S. PATENT DOCUMENTS

| | | | |
|---|---|---|---|
| 5,893,095 | A | 4/1999 | Jain et al. |
| 5,915,250 | A | 6/1999 | Jain et al. |
| 6,285,999 | B1 | 9/2001 | Page |
| 7,035,467 | B2 | 4/2006 | Nicponski |
| 7,286,724 | B2 | 10/2007 | Seol et al. |
| 7,672,976 | B2 | 3/2010 | Tobin et al. |
| 7,801,907 | B2 | 9/2010 | Fischer et al. |
| 7,904,455 | B2 | 3/2011 | Chiu et al. |
| 7,941,442 | B2 | 5/2011 | Li et al. |
| 7,961,986 | B1 | 6/2011 | Jing et al. |
| 8,090,222 | B1 | 1/2012 | Baluja et al. |
| 8,209,330 | B1 | 6/2012 | Covell et al. |
| 2001/0033693 | A1 | 10/2001 | Seol et al. |
| 2003/0048950 | A1 | 3/2003 | Savakis et al. |
| 2003/0059107 | A1 | 3/2003 | Sun et al. |
| 2005/0055344 | A1 | 3/2005 | Liu et al. |
| 2005/0094901 | A1 | 5/2005 | Seol et al. |

(Continued)

OTHER PUBLICATIONS

Tombros et al., "Query-Sensitive Similarity Measures for Information Retrieval," Jan. 15, 2004, Knowledge and Information Systems, Springer-Verlag London Ltd.*

(Continued)

*Primary Examiner* — Charles Kim
*Assistant Examiner* — Grace Park
(74) *Attorney, Agent, or Firm* — Fish & Richardson P.C.

(57) ABSTRACT

Methods, systems, and apparatus, including computer program products, for ranking images are disclosed. An image search subsystem generates an adjustment factor representative of a quality measure of an image relative to a search query. The quality represents a relevance of the image to the query. The adjustment factor can be computed based on relevance data for the image to the query and image similarity data representing a relative similarity between the image and other images relevant to the query. The relevance data can be based on user actions in response to the image being included in search results for the query. The adjustment factor can be scaled based on whether the relevance data and the image similarity data both indicate that the image is relevant to the search query. A relevance score is computed based on the adjustment factor (e.g., a product of the adjustment factor and relevance score).

20 Claims, 3 Drawing Sheets

(56) References Cited

U.S. PATENT DOCUMENTS

| | | |
|---|---|---|
| 2005/0142529 A1 | 6/2005 | Andreyev et al. |
| 2006/0165277 A1 | 7/2006 | Shan et al. |
| 2006/0204142 A1 | 9/2006 | West et al. |
| 2007/0036371 A1 | 2/2007 | Buil et al. |
| 2007/0098266 A1 | 5/2007 | Chiu et al. |
| 2007/0237426 A1 | 10/2007 | Xie et al. |
| 2007/0288462 A1 | 12/2007 | Fischer et al. |
| 2009/0150376 A1 | 6/2009 | O Callaghan et al. |

OTHER PUBLICATIONS

Bartell, "Optimizing Ranking Functions: A Connectionist Approach to Adaptive Information Retrieval," 1994, University of California, San Diego, pp. 64-65.*

Bederson, B.B., "PhotoMesa: A Zoomable Image Browser Using Quantum Treemaps and Bubblemaps", Nov. 11-14, 2001, Proceedings of the 14th Annual ACM Symposium on User Interface Software and Technology, pp. 71-80.

Berg, T.L., et al., "Automatic Ranking of Iconic Images", Tech. Rep., UCB/EECS-2007-13, EECS Department, University of California, Berkeley, Jan. 2007, 13 pgs.

Brin, Sergey et al., "The Anatomy of a Large-Scale Hypertextual Web Search Engine", 7ln International World Wide Conference, Brisbane, Australia, 1998, 20 pages.

Brown, M., et al., "Recognizing Panoramas", Proceedings of the ICCV, 2003. http://www.cs.ubc.ca/nest/Ici/papers/2003/brown03.pdf., 8 pgs.

Combs, Tammara, "Does Zooming Improve Image Browsing?," Feb. 1999, HCIL Technical Report No. 99-05, 10 pages.

Dalal, Navneet, et al., "Histograms of Oriented Gradients for Human Detection", Proceedings of the IEEE Conference on Computer Vision and Pattern Recognition, Jun. 2005, pp. 886-893. http://www.vis.uky.edu/~dnister/Teaching/CS684Fall2005/HOG.pdf.

Frey et al., "Clustering by Passing Messages Between Data Points," Science, Feb. 16, 2007, vol. 315, pp. 972-976.

Gibson, David et al., "Inferring Web Communities from Link Topology", Proc. 91n ACM Conference on Hypertext and Hypermedia, 1998, 10 pages.

Gomi et al., "CAT: A Hierarchical Image Brower Using a Rectangle Packing Technique", Jul. 9-11, 2008, IEEE Computer Society, 12th International Conference Information Visualization, pp. 82-87.

Google, "Chrome Web Store", Image Search Cooliris, downloaded from the internet at https://chrome.google.com/webstore/detail/jilgofbnhaihnfbokejhcndhoogagdmk, on Aug. 29, 2011, 2 pgs.

Grauman, Kristen et al., "The Pyramid Match Kernel: Discriminative Classification with Sets of Image Features", Massachusetts Institute of Technology, Computer Science and Artificial Intelligence Laboratory, Cambridge, MA, USA, In Proceedings of the IEEE International Conference on Computer Vision, Beijing, China, Oct. 2005, 8 pages.

Haveliwala, T., "Topic-Sensitive PageRank: A Context-Sensitive Ranking Algorithm for Web Search", IEEE Trans. Knowl. Data Eng., 15(4), 2003, pp. 784-796.

Huynh et al., "Time Quilt: Scaling up Zoomable Photo Browsers for Large, Unstructured Photo Collections", Apr. 2-7, 2004, CHI, Portland, OR, 4 pgs.

Jing et al., "VisualRank: Applying PageRank to Large-Scale Image Search," IEEE Transactions on Pattern Analysis and Machine Intelligence, vol. 30, No. 11, Nov. 2008, 14 pgs.

Ke, Yan et al., "PCA-SIFT: A More Distinctive Representation for Local Image Descriptors", Proceedings of Computer Vision and Pattern Recognition, 2004, 8 pages.

Kennedy, L, et al., "Generating Diverse and Representative Image Search Results for Landmarks", in Prof. 17th International World Wide Web Conference (WWW2008), Beijing, China, Apr. 21-25, 2008, 10 pages.

Lowe, David G., "Local Feature View Clustering for 3D Object Recognition", Proceedings of the IEEE Conference on Computer Vision and Pattern Recognition, Dec. 2001, 7 pages. http://www.cs.ubc.ca/~lowe/papers/cvpr01.pdf.

Mikolajczk, Krystian et al., "A Performance Evaluation of Local Descriptors", IEEE Transactions on Pattern Analysis and Machine Intelligence, vol. 27, No. 10, Oct. 2005, pp. 1615-1630.

Mikolajczyk et al., A Performance Evaluation of Local Descriptors, Department of Engineering Science, University of Oxford, Oxford, United Kingdom, Oct. 6, 2004, 33 pages.

Nister, David et al., "Scalable Recognition with a Vocabulary Tree", Proceedings of IEEE Conference Computer Vision and Pattern Recognition, Jun. 2006, pp. 2161-2168.

Pampalk, "Limitations of the SOM and the GTM", Feb. 13, 2001, published on the Web, 11 pgs.

Peterson, "Using Google Maps to Zoom Photographs", copyright 2008, downloaded from the internet at http://forevermore.net/articles/photo-zoom/, on Aug. 16, 2011, 7 pgs.

Quadrianto et al., "Kernelized Sorting", Dec. 2009, IEEE Trans. on Pattern Analysis and Machine Intelligence PAMI, 32(10): 1809-1821, 8 pgs.

Rodden et al., "Does Organisation by Similarity Assist Image Browsing?", 2001, SIGCHI, Seattle, WA 8 pgs.

Rothganger, F., et al., "3D Object Modeling and Recognition Using Local Affine-Invariant image Descriptors and Multi-View Spatial Constraints", International Journal of Computer Vision, 2006, 66(3), 231-259.

Simon, I., et al., "Scene Summarization for Online Image Collections", in Proc. 11th International Conference on Computer Vision (ICCV), 2007, 8 pages.

Unknown Author, "Image Cruiser", Preview, downloaded from the Internet at http://imagecruiser.jp/light/demo_en.html, on Sep. 13, 2011, 1 pg.

Unknown Author, "Treemapping", Wikipedia, downloaded from the Internet at: http://en.wikipedia.org/wiki/Treemapping, on Aug. 25, 2011, 4 pgs.

Vogelhuber, V., et al., "Face Detection Based on Generic Local Descriptors and Spatial Constraints", International Conference on Pattern Recognition (ICPR '00) 1 (2000), pp. 1084-1087, ftp://ftp.inrialpes.fr/pub/movi/publications/VogelhuberSchmid-icpr00/ps.gz.

Yang et al., "Semantic Image Browser: Bridging Information Visualization with Automated Intelligent Image Analysis", Nov. 2006, Proc. IEEE Symposium on Visual Analytics Science and Technology, pp. 191-198.

Jing et al., "Google Image Swirl: A Large-Scale Content- Based Image Browsing System", Jul. 2010, Proceedings ICME, 1 pg.

Lowe, David G., "Distinctive Image Features from Scale-Invariant Keypoints", International Journal of Computer Vision, 60, 2m 2004, http://www.cs.ubc.ca/~lowe/papers/ijcv04.pdf, downloaded May 18, 2012, 28 pages.

Frome et al, "Learning Globally-Consistent Local Distance Functions for Shape-Based Image Retrieval and Classification," 2007 IEEE 11th International Conference on Computer Vision, Rio de Janeiro, Brazil, Oct. 14-21, 2007, pp. 1-8.

Google, "About Google Image Swirl," Google Image Swirl Labs, downloaded from the internet at http://image-swirl.googleabs.com/html/en/help.html, on Aug. 17, 2011, 2 pages.

Grangier et al., "A Discriminative Kernal-Based Model to Rank Images from Text Queries," IEEE Transactions of Pattern Analysis and Machine Intelligence, Aug. 2008, vol. 30, No. 8, pp. 1371-1384.

Grauman, Kristen et al., "The Pyramid Match Kernel: Discriminative Classification with Sets of Image Features," Massachusetts Institute of Technology, Computer Science and Artificial Intelligence Laboratory, Cambridge, MA, USA, In Proceedings of the IEEE International Conference on Computer Vision, Beijing, China, Oct. 2005, 8 pages.

Jing et al., "PageRank for Product Image Search," Rich Media, Apr. 21-25, 2008, Beijing, China, pp. 307-315.

(56) References Cited

OTHER PUBLICATIONS

Lowe, David G., "Distinctive Image Features from Scale-Invariant Keypoints," International Journal of Computer Vision, 60(2), 2004, http://www.cs.ubc.ca/~lowe/papers/ijcv04.pdf, downloaded May 18, 2012, 21 pages.

Rothganger, Fred et al., "3D Object Modeling and Recognition Using Local Affine-Invariant Image Descriptors and Multi-View Spatial Constraints," Conference on Computer Vision and Pattern Recognition, 2004, 47 pages.

Rothganger, F., et al., "3D Object Modeling and Recognition Using Local Affine-Invariant image Descriptors and Multi-View Spatial Constraints," International Journal of Computer Vision, 2006, 66(3), pp. 231-259.

* cited by examiner

ORDERING IMAGE SEARCH RESULTS

CROSS-REFERENCE TO RELATED APPLICATIONS

This application is a continuation of and claims priority under 35 U.S.C. §120 to U.S. application Ser. No. 12/475,006 titled "Ordering Image Search Results" filed May 29, 2009, the disclosure of which is incorporated herein by reference in its entirety.

BACKGROUND

This specification relates to digital information retrieval, and particularly to processing search results.

The Internet enables access to a wide variety of resources, such as video or audio files, web pages for particular subjects, book articles, or news articles. A search system can identify resources in response to a search query that includes one or more search terms or phrases. The search system ranks the resources based on their relevance to the search query and resource importance and provides search results that reference the identified resources. The search results are typically ordered according to a rank score that is assigned to each of the resources based on the relevance of the resource to the search query.

The relevance of a resource to a search query can be determined, in part, based on the textual content of the resource or textual content associated with the resource. For example, text included in the content of a resource can be compared to the search query to determine whether the resource is relevant to the search query. In turn, rank scores can be assigned to the resources based on the relevance determination and the resources can be ordered, in part, based on the rank scores.

While textual features associated with a resource can provide information by which a search system can determine the relevance of the resource to the search query, some resources do not contain much, if any, textual content that can be used to accurately determine the relevancy of the resource. Similarly, textual content associated with the resource may be misleading as to the relevance of the image to the search query and can lead to inconsistent relevance data. An image is an example of a resource that may not be associated with textual content that facilitates accurate determination of the relevance of the image to the search query.

SUMMARY

In general, one aspect of the subject matter described in this specification can be embodied in methods that include accessing, from a query log, image search results responsive to a search query, the image search results specifying a plurality of images; for each image in the plurality of images: accessing relevance data that specifies a relevance of the image to the search query; accessing image similarity data for the image that defines a relative similarity between the image and other images in the plurality of images; and generating an adjustment factor based on the relevance data and the image similarity data, the adjustment factor representing a quality measure for the image relative to the search query. Other embodiments of this aspect include corresponding systems, apparatus, and computer program products.

These and other embodiments can optionally include one or more of the following features. The methods can include receiving a request for image search results responsive to the search query; for each image identified for inclusion in the image search results, generating image score data representing an image rank score based on the adjustment factor; and ordering the image search results based on the image score data.

The adjustment factor can be scaled by an amplification factor when a co-relevance condition is satisfied, the co-relevance condition being indicative of at least two relevance thresholds being satisfied. The co-relevance condition can be satisfied when the relevance data specifies a relevance that satisfies an upper relevance threshold and the image similarity data specifies a relative similarity that satisfies an upper similarity threshold. Scaling the adjustment factor can include determining a product of an amplification factor and the adjustment factor.

The adjustment factor can be scaled by an inverse-amplification factor when a co-irrelevance condition is satisfied, the co-irrelevance condition being indicative of at least two irrelevance thresholds being satisfied. The co-irrelevance condition can be satisfied when the relevance data specifies a relevance that satisfies a lower threshold relevance and the image similarity data specifies a relative similarity that satisfies a lower similarity threshold. The adjustment factor can be scaled by determining a product of an inverse-amplification factor and the adjustment factor.

Particular embodiments of the subject matter described in this specification can be implemented so as to realize one or more of the following advantages. Image search results responsive to a search query can be ordered according to an adjustment factor that adjusts an image rank score for an image responsive to a search query based on relevance data and image similarity data. Adjustment factors for images that are identified as relevant to the search query by two or more relevance factors can be scaled by an amplification factors to represent the increased relevance of the image to the search query. Adjustment factors for images that are identified as irrelevant to the search query by two or more relevance factors can be scaled by an inverse-amplification factor to represent the reduced relevance of the image to the search query.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
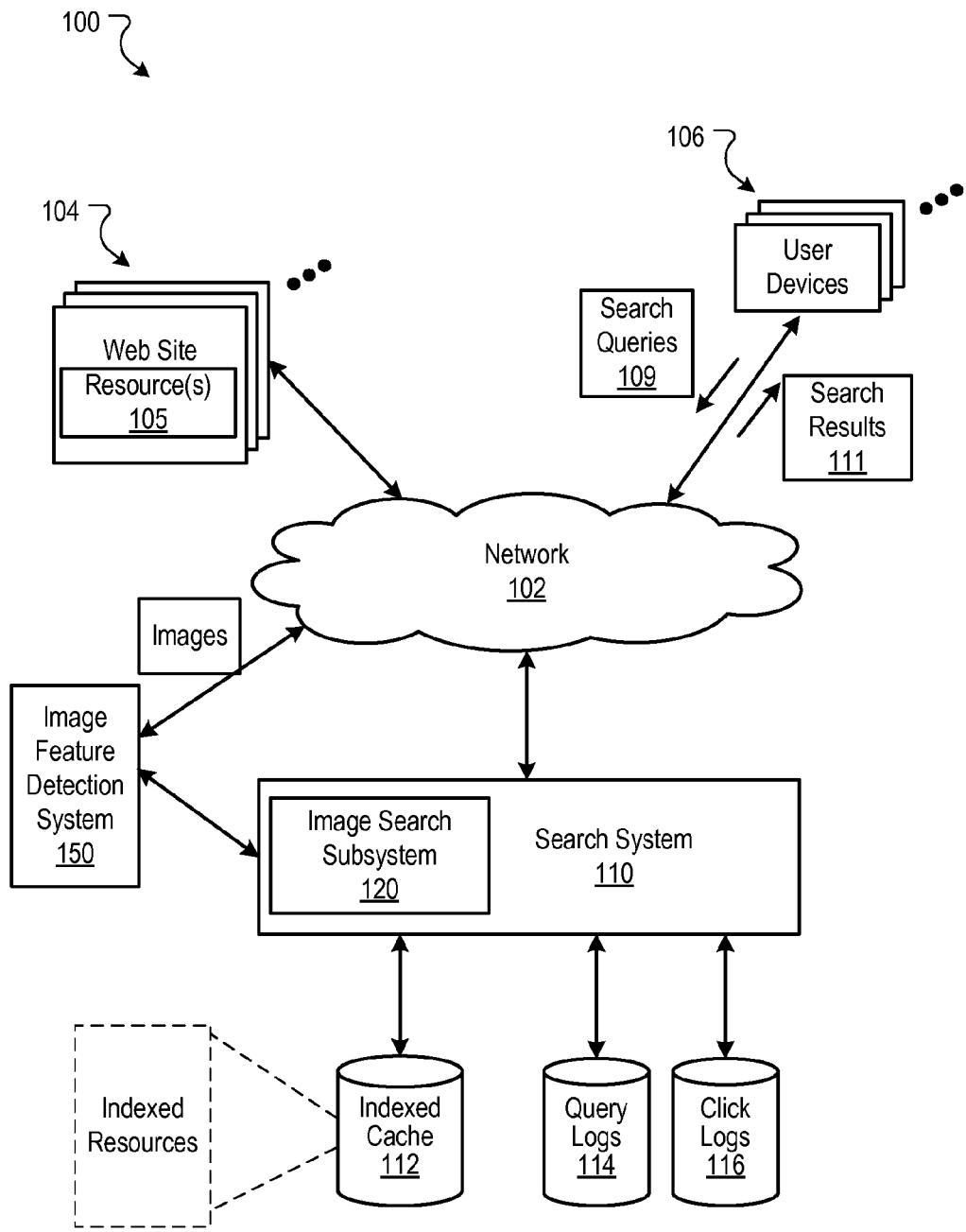
FIG. 1 is a block diagram of an example environment in which a search system provides search services.

FIG. 1 is block diagram of an example environment 100 in which a search system 110 provides search services. A computer network 102, such as a local area network (LAN), wide area network (WAN), the Internet, or a combination thereof, connects web sites 104, user devices 106, and the search system 110. The online environment 100 may include many thousands web sites 104 and user devices 106.

A web site is a one or more resources 105 associated with a domain name, and each web site is hosted by one or more servers. An example web site is a collection of web pages formatted in hypertext markup language (HTML) that can contain text, images, multimedia content, and programming elements, such as scripts. Each web site 104 is maintained by a publisher, e.g., an entity that manages and/or owns the web site.

A resource is any data that can be provided by the web site 104 over the network 102 and that is associated with a resource address. Resources include HTML pages, word processing documents, and portable document format (PDF) documents, images, video, and feed sources, to name just a few. The resources can include content, such as words, phrases, images and sounds and may include embedded information (such as meta information and hyperlinks) and/or embedded instructions (such as JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

As there are many thousands of web sites, there are millions of resources available over the network 102. To facilitate searching of these resources, the search system 110 identifies the resources by crawling the web sites 104 and indexing the resources provided by the web sites 104. Data about the resources can be indexed based on the resource to which the data corresponds. The indexed and, optionally, cached copies of the resources are stored in an indexed cache 112. The indexed cache 112 can be implemented in one or more data storage devices such as a volatile or non-volatile memory array, a magnetic storage medium, or any other data storage device.

The user devices 106 submit search queries 109 to the search system 110. In response, the search system 110 uses the indexed cache 112 to identify resources that are relevant to the queries. The search system 110 identifies the resources in the form of search results 111 and returns the search results 111 to the user devices 106 in search results pages. A search result 111 is data generated by the search system 110 that identifies a resource that satisfies a particular search query, and includes a resource locator for the resource. An example search result 111 can include a web page title, a snippet of text or a thumbnail of an image from the web page, and the URL of the web page.

Image search results are ranked based on search rank scores related to the resources identified by the search results, such as information retrieval ("IR") scores, a separate ranking of each resource relative to other resources ("page rank") and/or relevance feedback data. The relevance feedback data can include, for example, data specifying direct user feedback (e.g., a user's selection of a relevance score), a frequency of clicks or selections for the resource, or other user actions that are indicative of a relevance of the resources to the search results. In some implementations, the IR scores are computed from dot products of feature vectors corresponding to a query and a resource, and the ranking of the image search results is based on search rank scores that are a combination of the IR scores, page rank scores and relevance feedback data. The image search results are ordered according to these search rank scores and provided to the user device according to the order.

The user devices 106 receive the search results pages and render the pages for presentation to users. In response to the user selecting a search result at a user device 106, the user device 106 requests the resource identified by the resource locator included in the selected search result. The web site 104 hosting the resource receives the request for the resource from the user device 106 and provides the resource to the requesting user device 106.

The queries submitted during the user sessions to obtain image search results are stored in query logs 114. Image search results are search results for image resources. The image search results can include the image, a thumbnail of the image, text associated with the image, a filename of the image, and a URL of the image.

Relevance feedback data ("relevance data") for the images referenced by the image search results are stored in click logs 116. Relevance feedback data for images includes selection data defining actions taken by users responsive to image search results provided for the search sessions or images otherwise presented to users. For example, the relevance data can include data specifying a frequency of selections (e.g., click data) of an image when presented in search results for the search query, explicit user feedback rating the relevance of the image to the search query, and/or text similar to the user query appearing near the image. For example, a first image that is selected more often than a second image in response to a search query can be considered more relevant to the query than the second image. The query logs 114 and click logs 116 can each be implemented in one or more data storage devices such as a volatile or non-volatile memory array, a magnetic storage medium, or any other data storage device.

The query logs 114 and click logs 116 can be used to map queries submitted during search sessions to image resources that were identified in image search results and the actions taken by users. If time data are also stored, then the relative times at which those actions were taken can also be determined. The click logs 116 and query logs 114 can thus be used to map queries submitted during search sessions to image resources that were identified in response to the queries and that were selected by the users of the user devices 106. In some situations, IR scores and relevance feedback data can include inconsistencies that may reduce the quality of image search results. Accordingly, an adjustment factor can be used to adjust ordering of image search results to offset effects of these inconsistencies.

The search system 110 includes an image search subsystem 120 to provide an adjustment factor for ordering search results for images. The adjustment factor is a numerical value that represents a quality measure for an image (or group of images) relative to a search query. For example, an adjustment factor for a first image that is more related (i.e., a better image to include in search results) to a particular search query than a second image can be higher than the adjustment factor for the second image.

In some implementations, the image search subsystem 120 generates adjustment factors for images that are identified in response to a query based on the relevance feedback data for the images and image similarity data corresponding to the images. The adjustment factor for an image can be scaled by an amplification factor when a co-relevance condition is satisfied. The adjustment factor for each image is applied to the search rank score for the corresponding image, resulting in an adjusted search rank score. The adjusted search rank score for an image is referred to in the instant specification as an image rank score for the image. The image search results are ordered based on the search ranks scores and the adjustment factors for the images. The following discussion describes adjustment factors as being independent for individual images, but adjustment factors can also be applied to groups of images.

Adjustment factors can be generated for each image that is identified as relevant to a search query. In some implementations, an image is identified as relevant to a search query when the image has been identified by the search system 110 as an image that matches the search query. An image can match a search query, for example, by being associated with text that is the same as the search query. An image can also match a search query by being associated with text that is a synonym of the search query or otherwise identified to belong to a similar topic as the search query.

In other implementations, an image may only be identified as relevant to a search query if the image has a search rank score that is one of a top N number of search rank scores for images that satisfy the search query, where N is a threshold number of images. For example, the image search subsystem 120 can identify an image as relevant to a search query when the image is one of the top 1000 resources identified by the search system 110 in response to the search query, based on the search rank score of the images. The N number of images identified as relevant to a search query can be adjusted based on particular implementation details such as processing resources and/or a total number of resources identified in response to each search query.

Because an image may be identified as relevant to many different independent search queries, a single image can have independent adjustment factors for each search query for which the image is one of the top N relevant images. For example, an image of Wrigley Field may be independently relevant to the queries "baseball" and "Chicago." However, the quality of the image relative to each query may differ. Therefore, a separate adjustment factor for the image relative to each of the queries can be generated to represent the quality of the image for each of the queries.

An adjustment factor of an image can be combined with other search result relevance metrics (e.g., search rank scores) to determine an image rank score for the image relative to the query. An image rank score is a score that represents a relevance of an image to a search query based on relevance data and image similarity data. Image search results are ordered based on magnitudes of the image rank scores for images relative to the query.

In some implementations, the image rank score for an image relative to a query is determined based on a function of the adjustment factor and a search rank score. The function can be an additive function, power function, logarithmic function, or any other mathematical function of the adjustment factor and the search rank score. For example, the image search subsystem 120 can access search rank scores generated by the search system 110 for images that are referenced by the search results responsive to a search query. In turn, the image search subsystem 120 can adjust the search rank scores by determining a result of the function of the search rank scores and the adjustment factors. The resulting values are the image rank scores for the images. These image rank scores can be used by the search system 110 to re-order the search results based on the image rank scores. For example, the image search results can be ordered so that the search results for images are ranked in descending order of image rank scores.

In some implementations, the image search subsystem 120 provides the adjustment factor to the search system 110. The search system 110 can determine the image rank scores, for example, by scaling search rank scores for the images by the adjustment factors. In turn, the search system 110 can order or re-order image search results based on the image rank scores.

Figure 2:
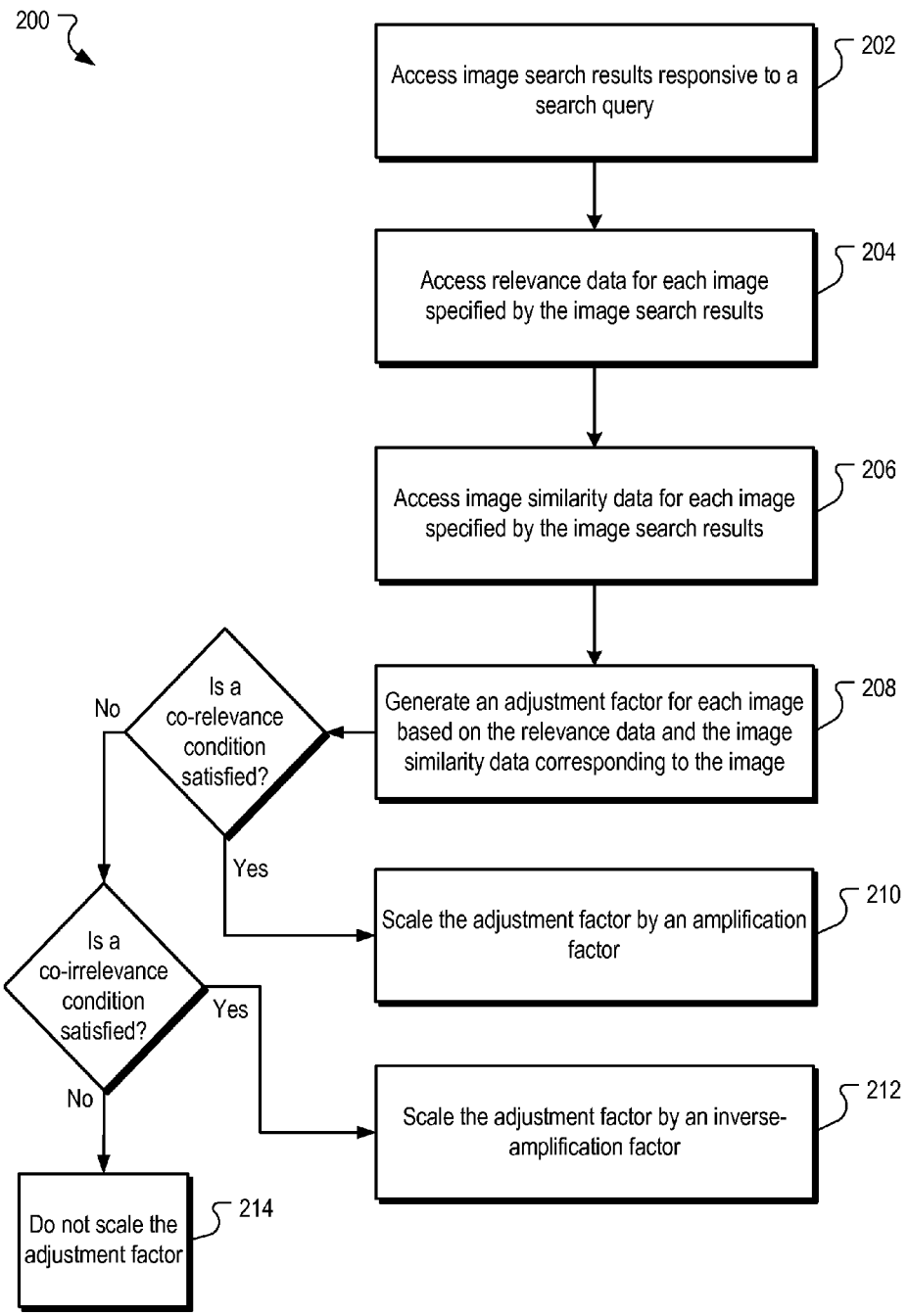
FIG. 2 is a flowchart of an example process for generating adjustment factors for image search results.

FIG. 2 is an example process 200 for generating adjustment factors for image search results. The process 200 can be implemented by the image search subsystem 120.

Image search results responsive to a search query are accessed (202). In some implementations, the image search results specify images that were included in search results for a user query. For example, many different images of the Eiffel Tower may have been identified in response to a user query for "Eiffel Tower." Many of the images may depict the Eiffel Tower from a similar or different perspective. For example, the images may depict the Eiffel Tower at the same or different zoom levels, in the same or different lighting conditions (night v. day), and from the same or different viewing angles. However, some of the images identified may not depict the Eiffel Tower, such as an image that is described in text appearing near the image as "view from the Eiffel Tower."

As described above, all images that are specified by the image search results can be accessed or only a portion of the images can be accessed. For example, a threshold number (e.g., 1000) images included in the image search results can be accessed. The images included in the threshold number of images can be determined based on an order in which the images are referenced in the image search results. As discussed above, the order in which the images are referenced in the image search results can be based on a search rank score generated by the image search system 110. Thus, the images accessed can be the images that have the threshold number of highest search rank scores.

Relevance data for each image specified by the image search results are accessed (204). As described above, the relevance data are data used to specify a measure of relevance of the image to the search query based on user actions. For example, a first image that is selected more often than a second image in response to a search query can be considered more relevant to the query than the second image. Similarly, when a threshold number of users have indicated that particular text is descriptive of the image, the text can be identified as relevant to the image. The relevance data can be accessed, for example, from the click log 116 and query log 114. The relevance data can be click data or other relevance data as described above, or normalized relevance data such as normalized click data.

The relevance data can be normalized data so that values representing the relevance of images to the search query are within an expected data range. Normalizing relevance data, such as click data, is beneficial when non-normalized click data for different images varies widely such that the click data falls outside of an expected data range. Click data can fall outside of an expected data range when click data for a new image and click data for an old image are being compared. In this example, the new image has only recently been made available and has only a fraction of the selections of the old image that has been available for many years. Thus, the click data for each of these images are orders of magnitude different from each other. Thus, it may be difficult to compare the click data for the two images without normalizing the click data.

In some implementations, the relevance data can be normalized by binning the images based on the magnitude of their relevance data. For example, ten bins can be defined for binning the images, each image being binned into a bin based on its click data. Each bin can be defined to contain an equal percentage (e.g., 10%) of the total images based on a respective number of clicks. For example, the images having click data representing the highest 10% of total clicks can be binned in bin 10. Similarly, the images having click data representing the second highest 10% of total clicks can be binned in bin 9. The images can continue to be binned in this manner until all images have been binned.

Binned images can be assigned normalized relevance data that corresponds to the bin in which the image is binned. For example, the images that are binned in bins 10 and 9 can be assigned relevance data specifying respective values of 10 and 9. The images in the other bins can similarly be assigned relevance data specifying a value that corresponds to the bin in which the image is binned. Normalizing relevance data in this manner ensures that the relevance data for each image specifies a value between 1 and 10. Thus, each image has relevance data that is within an expected data range.

Image similarity data for each image specified by the image search results are accessed (206). The image similarity data for each image specifies a relative similarity between the image and other images that are identified as relevant to the search query. Image similarity data can be used as an implied measure of relevance of an image to a search query. For example, if a first image is very similar to a second image that is identified as relevant to the search query, it is more likely that the relevance of the first image is also relevant to the search query. However, if the first image and the second image are very dissimilar, the relevance of the second image may not be as indicative of the relevance of the first image to the search query. Image similarity data can be accessed from a data store storing image similarity data or received from an image feature detection system 150.

In some implementations, image similarity data for each image can include a visual distance measure representing a visual distance between the image features of an image and image features of other images identified as relevant to the search query. The visual distance between the image and the other images can be, for example, a weighted sum of distances between patch-based shape features. These patch-based shape features can be determined by image feature detection algorithms such as scale-invariant feature transform (SIFT) or geometric blur. Other image feature detection algorithms can be used for identifying image features for determining the visual distance between the image and the other images.

In some implementations, the visual distances between images can be organized in a visual distance matrix. A visual distance matrix is a matrix that specifies similarities (or differences) of an image relative to other images. The visual distance matrix can be organized as an N×N matrix of visual distances, where N is a number of images that are accessed as described above. For example, if 1000 images are accessed, the visual distance matrix is a 1000×1000 matrix of visual distances. An example visual distance matrix for images $I_1$-$I_N$ is presented below.

|     | $I_1$ | $I_2$ | ... | $I_N$ |
| --- | --- | --- | --- | --- |
| $I_1$ | 0 | .2 | ... | .3 |
| $I_2$ | .2 | 0 | ... | .4 |
| ... | ... | ... | ... | ... |
| $I_N$ | .3 | .4 | ... | 0 |

Each value in the example visual distance matrix represents the visual distance (or similarity) between a pair of images (e.g., $I_1$ and $I_2$). For example, the lower a value in the matrix, the smaller the visual distance between the images. Thus, images having a smaller visual distance between them are more similar than images having a high visual distance between them. A visual distance of zero is indicative of two images that are identical.

In some implementations, a visual score is generated for each image based on the visual distance measures between the image and the other images represented in the matrix. For example, the visual score for an image can be based on statistical measures (e.g., mean, median and/or variance) of visual distances of an image relative to statistical measures (e.g., mean, median and/or variance) of visual distances of other images represented in the matrix. For example, the visual score for each image can be based on statistical measures of the image relative to all images represented in the visual distance matrix, or relative to statistical measures of the visual distances between the image and images that are near (e.g., within a threshold number of images when I1-IN are arranged in order relative to the order of the search results) the image in the visual distance matrix.

The visual distance matrix also facilitates identification of image clusters. Image clusters are two or more images that share similar image features. Image clusters can be identified based on the visual distance measures in the visual distance matrix to identify images that have similar image features, and, therefore, can be grouped together in a cluster. The image clusters can be identified from the visual distance matrix, for example, based on a hierarchical agglomerative clustering algorithm, k-means clustering algorithm or other clustering algorithms.

In some implementations, rather than identifying clusters of images, the image cluster data can be received from an image clustering system that implements a clustering algorithm, for example, as described above.

In some implementations, each image cluster defined by the image cluster data can have a corresponding cluster score. The cluster score is a score similar to a visual score. A cluster score is assigned to a cluster based on the visual distances of images that are included in the cluster relative to the images in other clusters. The cluster score can be based on statistical measures of the visual distances of images in the image cluster relative to statistical measures of the visual distances of images in other image clusters. For example, the cluster score can be based on the mean, median, and variance of the visual distance measures of images in the image cluster relative to the mean, median and variance of visual distance measures of the other image clusters.

The cluster score can be used to augment the visual score for each image in the image cluster. For example, the visual score of an image can be scaled based on the cluster score. The cluster score can be accessed, for example, from a cluster data store, the indexed cache 112 or a clustering system. Alternatively, the cluster score can be generated by the image search subsystem 120.

In some implementations, the visual scores for images (or clusters) can be normalized so that visual scores for different image sets can be directly compared based on the visual scores. For example, each of the images can be assigned a normalized visual score that falls within an expected numerical range. The images can be assigned a normalized visual score in a manner similar to that described with respect to normalizing relevance feedback data. The normalized visual scores can have a scale that is common to the normalized relevance data (e.g., 1-10) or the normalized visual scores can have a different scale (e.g., 0.5-1.5). For example, a normalized visual score scale may assign normalized visual scores that range from 0.5-1.5 based on how similar the image or cluster is to other images that were identified as relevant to the search query. In this example, an image being assigned a normalized visual score of 0.5 may be an image that is very dissimilar to other images that are identified as relevant to the search query, while an image being assigned a normalized visual score of 1.5 may be an image that is very similar to the other images.

An adjustment factor is generated for each image based on the relevance data and the image similarity data corresponding to the image (208). In some implementations, the adjustment factor is generated based on a function of the relevance data and the image similarity data. For example, the adjustment factor for an image can be a product of the relevance score for the image and the visual score for the image. The adjustment factor can be generated, for example, by the image search subsystem 120.

In some implementations, adjustment factors for images are scaled by an amplification factor based on satisfaction of a co-relevance condition (210). A co-relevance condition is a condition in which two or more relevance measures satisfy thresholds indicating that an image is relevant to the search query. A co-relevance condition is satisfied, for example, when the relevance data and the image similarity data each satisfy respective upper thresholds, as described below. The amplification factor is a numerical value that can be a constant value for each image and/or search query or a value that is determined on an image-by-image and/or query-by-query basis.

Satisfaction of the co-relevance condition can be indicative of an image that is very relevant to the search query because the relevance of the image to the query is supported by two separate relevance measures. For example, when relevance data indicates that a high percentage of users selected an image in response to the search query, it is likely that the image is relevant to the search query because users often select images that are relevant to the query. Similarly, when the image similarity data indicates that the image is similar to a large number of other images that were identified as relevant to the search query, it is likely that the image is also relevant to the search query. For example, images are generally identified, in part, based on previous selections of the image in response to the search query, among other relevance factors. Therefore, because many other images identified in response to the search query are likely relevant to the search query, an image that is similar to a large number of other images identified in response to a search query is also likely relevant to the search query. Thus, when these two relevance factors both indicate that the image is relevant to the search query there is an increased probability that the image is relevant to the search query.

In some implementations, the co-relevance condition is satisfied for an image when the relevance data specifies a relevance of the image to the user query that satisfies an upper relevance threshold and the image similarity data specifies a relative image similarity that satisfies an upper similarity threshold. For example, the upper relevance threshold can be a minimum relevance score and the upper similarity threshold can be a minimum visual score. The upper relevance threshold and the upper similarity threshold can each be expressed, for example, as an absolute number (e.g., 2) or a percentage of a total (e.g., 10%). Each of the thresholds is satisfied when a value is equal to or greater than the threshold.

An adjustment factor can be scaled by the amplification factor, for example, by determining a result of a function of the amplification factor and the adjustment factor. When the amplification factor is greater than one, the product of the amplification factor and the adjustment factor will result in a larger adjustment factor, thereby indicating an increased relevance of the image to the search query.

Adjustment factors for images are scaled by an inverse-amplification factor based on satisfaction of a co-irrelevance condition (212). A co-irrelevance condition is a condition in which two or more relevance measures satisfy irrelevance thresholds indicating that the image has low relevance to the search query. A co-irrelevance condition is satisfied, for example, when the relevance data and the image similarity data each satisfy respective lower thresholds, as described below. The inverse-amplification factor is a numerical value that can be a constant value for each image and/or search query or a value that is determined on an image-by-image and/or query-by-query basis. In some implementations, the inverse-amplification factor is a function of an inverse of the amplification factor (e.g., f(1/amplification factor). Satisfaction of the co-irrelevance condition can be indicative of an image that is likely not relevant to the search query.

In some implementations, the co-irrelevance condition is satisfied for an image when the relevance data specifies a relevance of the image to the user query that satisfies a lower relevance threshold and the image similarity data specifies a relative image similarity that satisfies a lower similarity threshold. For example, the lower relevance threshold can be a maximum relevance score and the lower similarity threshold can be a maximum visual score. The lower relevance threshold and the lower similarity threshold can each be expressed, for example, as an absolute number (e.g., 0.1) or a percentage of a total (e.g., 0.2%). Each of the thresholds is satisfied when a value is equal to or less than the threshold.

The adjustment factor is not scaled when neither of the co-relevance condition and the co-irrelevance condition are satisfied (214). In these situations, a limit can be placed on the value of the adjustment factor to prevent either the relevance data or the similarity data from improperly controlling the value of the adjustment factor for the image.

For example, if a cartoon parody of a celebrity is selected a large number of times when presented in search results for the celebrity's name, the relevance score for the image may be high relative to other images. However, many users having selected the cartoon parody, possibly out of curiosity of the contents, is not a conclusive indication that the image is very relevant to the search query. Thus, placing an upper limit on an adjustment score for an image for which the co-relevance condition is not satisfied can reduce the chance that an image that is selected for reasons that are not indicative of the relevance of the image to the search query is associated with a large adjustment factor.

Figure 3:
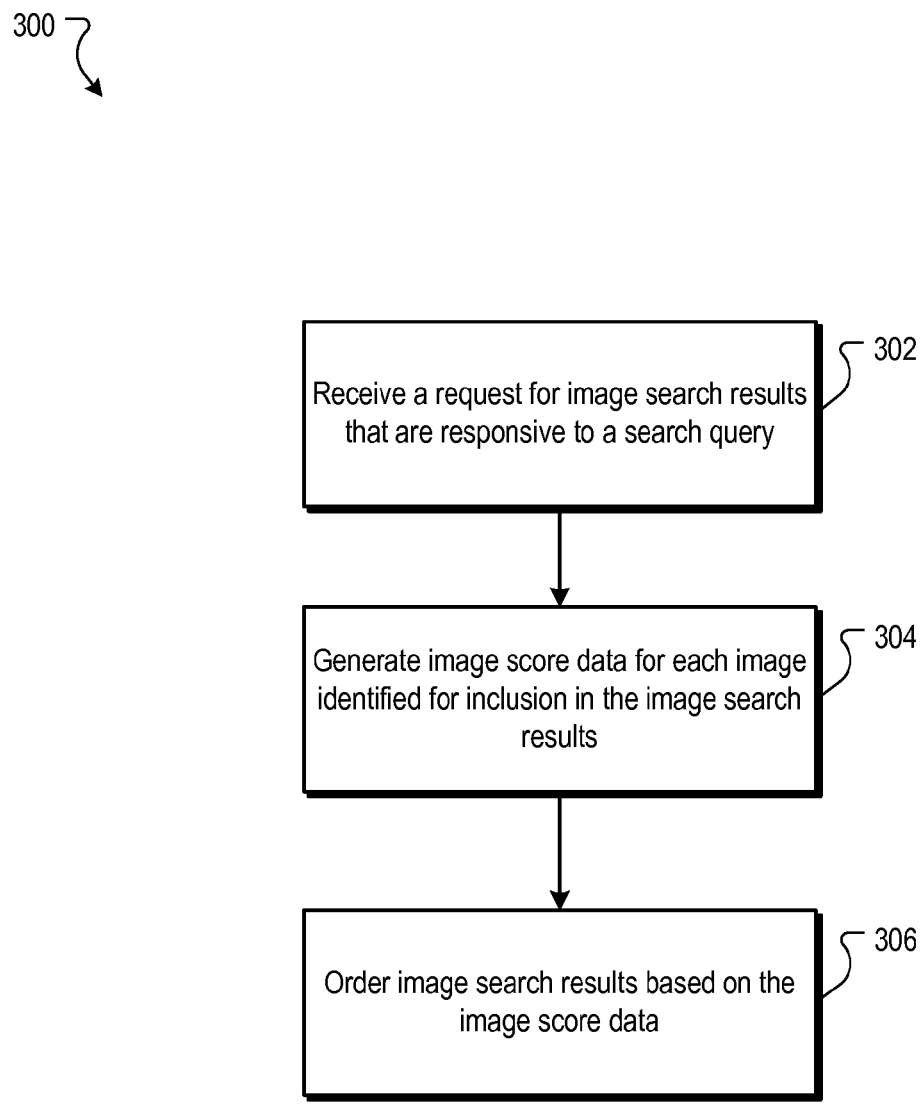
FIG. 3 is a flowchart of another example process for ordering search results based on an adjustment factor.

FIG. 3 is an example process (300) for ordering search results based on an adjustment factor. The process 300 can be implemented, for example, by the image search subsystem 120. A request for image search results responsive to a search query is received (302). In some implementations, the request can be based submission of a search query by a user device. The request can be received, for example, by the image search subsystem 120.

Image score data representing an image rank score is generated for each image identified for inclusion in the image search results (304). In some implementations, the image rank score is based on a function of the adjustment factor and a search quality result metric. For example, a search rank score is a search quality result metric that can be generated by a search system. A function of the search rank score and the adjustment factor can be defined as the image score for an image that can be represented by image score data. The image score data can be generated, for example, by the image search subsystem 120.

The image search results are ordered based on the image score data (306). In some implementations, the image search results are ordered for example so that images are presented in the image search results in descending order of image scores. The image search results can be ordered, for example, by the image search subsystem 120.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
identifying a plurality of image search results that are responsive to a search query;
determining that a relevance score for a particular image search result from the plurality of image search results meets a specified relevance score threshold, wherein the relevance score is determined independent of visual similarity between a particular image referenced by the particular image search result and other images that are referenced by the plurality of image search results;
determining that image similarity data for the particular image indicates that the particular image meets a threshold level of visual similarity to at least a threshold number of the other images that are referenced by the plurality of image search results;
determining that the particular image search result is a co-relevant image search result for the search query, the determination being performed in response to determining that both the relevance score meets the specified relevance score threshold, and the image similarity data for the particular image indicates that the particular image meets the threshold level of visual similarity to at least the threshold number of the other images; and
generating an image rank score for the particular image search result based on the relevance score and an amplification factor for image search results that are determined to be co-relevant, wherein the amplification factor is used to increase or decrease the image rank score.

2. The method of claim 1, further comprising:
receiving a request for image search results responsive to the search query;
for each co-relevant image search result identified for inclusion in the image search results, obtaining image score data indicative of the image rank score for the co-relevant image search result; and
ordering the image search results based on the image score data.

3. The method of claim 1, wherein the relevance score threshold is a minimum relevance score required for a search result to be eligible to be determined a co-relevant search result, and the threshold level of visual similarity is a minimum level of visual similarity required for a search result to be eligible to be determined a co-relevant search result.

4. The method of claim 1, wherein generating the image rank score comprises determining a product of the amplification factor and the relevance score.

5. The method of claim 1, further comprising:
determining that a second image search result, from the plurality of image search results that are responsive to the search query, is a co-irrelevant result, the determination being based on both:
a relevance score for the second image search result meeting a specified irrelevance score threshold; and
image similarity data for a second image referenced by the second image search result indicating that the second image meets a lower threshold level of visual similarity to at least a second threshold number of the other images that are referenced by the plurality of image search results; and
generating an image rank score for the second image search result based on the relevance score and an inverse amplification factor for image search results that are determined to be co-irrelevant.

6. The method of claim 5, wherein the irrelevance score threshold is a maximum relevance score allowed for a search result to be eligible to be determined a co-irrelevant search result, and the lower threshold level of visual similarity is a maximum level of visual similarity allowed for a search result to be eligible to be determined a co-irrelevant search result.

7. The method of claim 1, wherein the relevance score for an image search result is based on click data stored in a click log.

8. The method of claim 1, wherein the relevance score for an image search result is based on user feedback specifying a relevance of the image referenced by the image search result to the search query.

9. The method of claim 1, wherein the image similarity data comprises a visual distance matrix that specifies similarities between the particular image and the other images that are referenced by the plurality of image search results, the similarities being specified by visual distance measures between image features of the particular image and image features of the other images the other images that are referenced by the plurality of image search results.

10. The method of claim 1, further comprising:
obtaining an image similarity score from the image similarity data, the image similarity score indicating a measure of visual similarity between the particular image and the other images that are referenced by the plurality of image search results; and
wherein the amplification factor is generated by determining a product of the image similarity score for the particular image referenced by the particular image search result and the relevance score for the particular image search result.

11. A system, comprising:
a data processing apparatus; and
a data store storing instructions that, when executed by the data processing apparatus, cause the data processing apparatus to perform operations comprising:
identifying a plurality of image search results that are responsive to a search query;
determining that a relevance score for a particular image search result from the plurality of image search results meets a specified relevance score threshold, wherein the relevance score is determined independent of visual similarity between a particular image referenced by the particular image search result and other images that are referenced by the plurality of image search results;
determining that image similarity data for the particular image indicates that the particular image meets a threshold level of visual similarity to at least a threshold number of the other images that are referenced by the plurality of image search results;

determining that the particular image search result is a co-relevant image search result for the search query, the determination being performed in response to determining that both the relevance score meets the specified relevance score threshold, and the image similarity data for the particular image indicates that the particular image meets the threshold level of visual similarity to at least the threshold number of the other images; and generating an image rank score for the particular image search result based on the relevance score and an amplification factor for image search results that are determined to be co-relevant, wherein the amplification factor is used to increase or decrease the image rank score.

12. The system of claim 11, wherein the operations further comprise:

receiving a request for image search results responsive to the search query;

for each co-relevant image search result identified for inclusion in the image search results, obtaining image score data indicative of the image rank score for the co-relevant image search result; and ordering the image search results based on the image score data.

13. The system of claim 11, wherein the operations further comprise:

determining that a second image search result, from the plurality of image search results that are responsive to the search query, is a co-irrelevant result, the determination being based on both:

a relevance score for the second image search result meeting a specified irrelevance score threshold; and image similarity data for a second image referenced by the second image search result indicating that the second image meets a lower threshold level of visual similarity to at least a second threshold number of the other images that are referenced by the plurality of image search results; and generating an image rank score for the second image search result based on the relevance score and an inverse amplification factor for image search results that are determined to be co-irrelevant.

14. The system of claim 11, wherein the image similarity data comprises a visual distance matrix that specifies similarities between the particular image and the other images that are referenced by the plurality of image search results, the similarities being specified by visual distance measures between image features of the particular image and image features of the other images the other images that are referenced by the plurality of image search results.

15. The system of claim 11, wherein the operations further comprise:

obtaining an image similarity score from the image similarity data, the image similarity score indicating a measure of visual similarity between the particular image and the other images that are referenced by the plurality of image search results; and wherein the amplification factor is generated by determining a product of the image similarity score for the particular image referenced by the particular image search result and the relevance score for the particular image search result.

16. A computer readable medium encoded with a computer program comprising instructions that when executed operate to cause a computer to perform operations comprising:

identifying a plurality of image search results that are responsive to a search query;

determining that a relevance score for a particular image search result from the plurality of image search results meets a specified relevance score threshold, wherein the relevance score is determined independent of visual similarity between a particular image referenced by the particular image search result and other images that are referenced by the plurality of image search results;

determining that image similarity data for the particular image indicates that the particular image meets a threshold level of visual similarity to at least a threshold number of the other images that are referenced by the plurality of image search results;

determining that the particular image search result is a co-relevant image search result for the search query, the determination being performed in response to determining that both the relevance score meets the specified relevance score threshold, and the image similarity data for the particular image indicates that the particular image meets the threshold level of visual similarity to at least the threshold number of the other images; and generating an image rank score for the particular image search result based on the relevance score and an amplification factor for image search results that are determined to be co-relevant, wherein the amplification factor is used to increase or decrease the image rank score.

17. The computer readable medium of claim 16, wherein the operations further comprise:

receiving a request for image search results responsive to the search query;

for each co-relevant image search result identified for inclusion in the image search results, obtaining image score data indicative of the image rank score for the co-relevant image search result; and ordering the image search results based on the image score data.

18. The computer readable medium of claim 16, wherein the operations further comprise:

determining that a second image search result, from the plurality of image search results that are responsive to the search query, is a co-irrelevant result, the determination being based on both:

a relevance score for the second image search result meeting a specified irrelevance score threshold; and image similarity data for a second image referenced by the second image search result indicating that the second image meets a lower threshold level of visual similarity to at least a second threshold number of the other images that are referenced by the plurality of image search results; and generating an image rank score for the second image search result based on the relevance score and an inverse amplification factor for image search results that are determined to be co-irrelevant.

19. The computer readable medium of claim 16, wherein the image similarity data comprises a visual distance matrix that specifies similarities between the particular image and the other images that are referenced by the plurality of image search results, the similarities being specified by visual distance measures between image features of the particular image and image features of the other images the other images that are referenced by the plurality of image search results.

20. The computer readable medium of claim 16, wherein the operations further comprise:
- obtaining an image similarity score from the image similarity data, the image similarity score indicating a measure of visual similarity between the particular image and the other images that are referenced by the plurality of image search results; and
- wherein the amplification factor is generated by determining a product of the image similarity score for the particular image referenced by the particular image search result and the relevance score for the particular image search result.

\* \* \* \* \*

UNITED STATES PATENT AND TRADEMARK OFFICE
CERTIFICATE OF CORRECTION

PATENT NO.        : 8,566,331 B1
APPLICATION NO.   : 13/532221
DATED             : October 22, 2013
INVENTOR(S)       : Michele Covell et al.

It is certified that error appears in the above-identified patent and that said Letters Patent is hereby corrected as shown below:

In the Claims

In Column 14, Line 37, Claim 9, before "that" delete "the other images" therefor.

In Column 15, Line 54, Claim 14, before "that" delete "the other images" therefor.

In Column 16, Line 65-66, Claim 19, before "that" delete "the other images" therefor.

Signed and Sealed this
Twenty-seventh Day of May, 2014

Michelle K. Lee
*Deputy Director of the United States Patent and Trademark Office*